US009361289B1

(12) United States Patent
Jampani et al.

(10) Patent No.: US 9,361,289 B1
(45) Date of Patent: Jun. 7, 2016

(54) RETRIEVAL AND MANAGEMENT OF SPOKEN LANGUAGE UNDERSTANDING PERSONALIZATION DATA

(71) Applicant: Amazon Technologies, Inc., Reno, NV (US)

(72) Inventors: Madan Mohan Rao Jampani, Bothell, WA (US); Arushan Rajasekaram, Seattle, WA (US); Nikko Strom, Kirkland, WA (US); Yuzo Watanabe, Seattle, WA (US); Stan Weidner Salvador, Tega Cay, SC (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 14/015,697

(22) Filed: Aug. 30, 2013

(51) Int. Cl.
*G06F 17/27* (2006.01)
*G10L 15/00* (2013.01)

(52) U.S. Cl.
CPC ........................................ *G06F 17/27* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ............. 704/1, 9, 10, 251, 257; 707/706–708
See application file for complete search history.

(56) References Cited

U.S. PATENT DOCUMENTS

| 5,425,128 A * | 6/1995 | Morrison | G10L 15/22 704/243 |
|---|---|---|---|
| 7,137,126 B1 * | 11/2006 | Coffman | G06F 17/30899 704/200 |
| 8,775,174 B2 * | 7/2014 | Conejero | G06F 17/3002 704/235 |
| 8,930,402 B1 * | 1/2015 | Singh | G06F 7/00 707/784 |
| 8,996,372 B1 * | 3/2015 | Secker-Walker | G10L 15/34 704/231 |
| 2003/0120493 A1 * | 6/2003 | Gupta | G10L 15/063 704/270.1 |
| 2004/0015365 A1 * | 1/2004 | Ohmori | G10L 15/22 704/276 |
| 2007/0043574 A1 * | 2/2007 | Coffman | G06F 17/30899 704/275 |
| 2008/0154870 A1 * | 6/2008 | Evermann | G06F 17/30867 |
| 2009/0222600 A1 * | 9/2009 | Lehr | G06F 9/5027 710/39 |
| 2010/0298010 A1 * | 11/2010 | Roth | H04M 1/72525 455/466 |
| 2011/0066634 A1 * | 3/2011 | Phillips | G10L 15/30 707/769 |
| 2011/0231189 A1 * | 9/2011 | Anastasiadis | G06F 17/30663 704/243 |
| 2012/0265764 A1 * | 10/2012 | Agrawal | G06F 17/301 707/746 |
| 2013/0325474 A1 * | 12/2013 | Levien | G10L 15/065 704/251 |
| 2014/0081636 A1 * | 3/2014 | Erhart | G06Q 50/01 704/236 |
| 2014/0129757 A1 * | 5/2014 | Lo | G06F 1/3225 711/103 |
| 2015/0220556 A1 * | 8/2015 | Lunden | G06F 17/30174 707/618 |

\* cited by examiner

*Primary Examiner* — Lamont Spooner
(74) *Attorney, Agent, or Firm* — Knobbe, Martens, Olson & Bear, LLP (57) ABSTRACT

Features are disclosed for maintaining data that can be used to personalize spoken language processing, such as automatic speech recognition ("ASR"), natural language understanding ("NLU"), natural language processing ("NLP"), etc. The data may be obtained from various data sources, such as applications or services used by the user. User-specific data maintained by the data sources can be retrieved and stored for use in generating personal models. Updates to data at the data sources may be reflected by separate data sets in the personalization data, such that other processes can obtain the update data sets separate from other data.

28 Claims, 5 Drawing Sheets

RETRIEVAL AND MANAGEMENT OF SPOKEN LANGUAGE UNDERSTANDING PERSONALIZATION DATA

BACKGROUND

Spoken language understanding systems typically include one or more models that they use to processing input. For example, automatic speech recognition systems include an acoustic model and a language model. The acoustic model is used to generate hypotheses regarding which words or sub-word units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken. Some speech recognition or speech processing systems also include models for natural language processing. These models are used to determine the meaning of a user utterance (or textual input).

Acoustic models, language models, natural language understanding models, and other models used in spoken language understanding (together referred to as spoken language understanding models), may be specialized or customized to varying degrees. For example, an automatic speech recognition system may have a general or base model that is not customized in any particular manner, and any number of additional models for particular genders, age ranges, regional accents, or any combination thereof. Some systems may have models for specific subject matter (e.g., medical terminology) or even specific users.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to obtaining and storing personalization data for use in language processing systems, including systems that perform automatic speech recognition ("ASR") and/or natural language processing ("NLP"). In some systems, personalized or customized models (e.g., language models, acoustic models, natural language understating or "NLU" models) may be generated and used. A system may access user-specific information relevant to providing personalization in speech recognition or other spoken language understanding functionality in order generate personal models. However, user-specific data relevant to language processing may often change. For example, song titles and artist names for music in a user's music catalog may be useful in providing personalization in speech recognition. Users may often purchase new music, delete unwanted music, and so on, thereby making it difficult for separate systems, such as ASR systems, to keep up-to-date music catalog information for a user (or thousands or millions of users). In addition, the most recent changes to the user's catalog may be the best predictors of what a user will say at a particular time (e.g., after purchasing a song, the next utterance may be more likely to include a command to play the new song than to do anything else, including playing older music). Unless data regarding the purchase (e.g., the song title) is obtained quickly and made available for use in generating or updating the user's personalized language model, the benefits of personalized models may not be fully realized.

Aspects of the present disclosure relate to determining when user-specific data, relevant to personalization of spoken language understanding ("SLU") processes or systems (e.g., ASR or NLU), is available from one or more data sources. The data sources may be heterogeneous and/or distributed across one or more networks. In some embodiments, a data source may be configured to generate and broadcast notifications regarding modifications to the data maintained by the data source, user interaction with a service or application associated with the data source, etc. For example, a data source may be associated with a music player application. When a user adds a song or album to the user's music catalog, user-specific application data is updated. The data source may broadcast a notification regarding the song or album addition. When a user plays a song, user-specific application data may not be updated, but the data source or application may nevertheless generate a notification of the user-initiated event. Occurrence of these events may increase a likelihood that subsequent utterances from the user will include words, phrases, named entities or intents associated with the events. A data harvesting service associated with an SLU system may subscribe to these and other notifications. The data harvesting service can process the notifications and store new data for use in future personalized module generation/updating processes.

Additional aspects of the disclosure relate to obtaining and storing the data in a format that facilitates efficient generation of personalized spoken language understanding models. The data harvesting service may maintain one or more data sets for a user. In some embodiments, the data sets may vary in size (e.g., based upon when or how the data is received, type of data, etc.). For example, when a user first registers for a spoken language processing system, the user may indicate one or more services that may have information relevant to personalization of SLU processing, such as music player services, contact management services, shopping services, social networks, and the like. The data harvesting service may obtain complete catalogs of user-specific data associated with these services, either as a single data set or as a collection of multiple smaller groups of data. Subsequent modifications to the user-specific data associated with these services (or user interaction with these services) may be received as individual records, "deltas" representing a difference from previously stored data, or other smaller data sets. The data harvesting service can store the update data associated with modifications and interactions in a manner that preserves the update data as a separate or substantially separate data set. For example, update data may be physically or logically separated from previously received data sets (e.g., stored in a different file or data object, or stored in the same data object subject to an index that allows separate retrieval of each update). As a result, downstream processes (e.g., components that build personalized speech recognition models) may more easily obtain new data without being required to access the entire catalog of user-specific data for a data source. The data stored by the data harvesting service may be substantially unmodified, such that it is stored in substantially the same format as it is stored at the separate services from which it is obtained. In some embodiments, the data may be processed into a format that is substantially different than that used by the separate data services and that, e.g., improves the efficiency of SLU model generation from the data.

Although aspects of the embodiments described in the disclosure will focus, for the purpose of illustration, on obtaining, storing and utilizing personalization data for the development of personalized ASR models (e.g., language models), one skilled in the art will appreciate that the techniques disclosed herein may be applied to any number of services, process, or applications. For example, personalization data may be obtained and stored for use in the development of NLU models or other models used in spoken language understanding. Various aspects of the disclosure will now be described with regard to certain examples and embodiments, which are intended to illustrate but not limit the disclosure.

With reference to an illustrative embodiment, a user may utilize various applications and services, and those applications and services may obtain and/or generate user-specific information about the user. For example, the user may access and use music players, video players, personal information management systems, shopping web sites, social media networks, and the like. Some or all of these applications and services may maintain a data store that includes user-specific information, such as a catalog of songs or videos owned by the user, a list of the user's contacts and appointments, a purchase history, a listing of groups to which the user belongs, etc. In addition, some or all of these applications and services may allow the user to initiate certain actions or events, such as playing a song or video, making a phone call, browsing items for sale, viewing posts by other users, etc. Information about such user actions may or may not be stored in the data store associated with each application or service.

The user may also utilize speech recognition services, such as those provided by a network-based ASR service (which may or may not be part of a larger spoken language processing system), an ASR service executing locally on the user's client device, or the like. Generally described, ASR systems use language models to help determine what a user has spoken. For example, a general language model may include a very large number of words and phrases in an attempt to cover most utterances made by a general population. The words may be ranked, scored, or weighted so that words which are used often by the general population are given more weight in ASR hypotheses than words which are rarely used. Such weights are typically based on speech patterns of a general population targeted by the general language model. However, because each user is unique and may, e.g., use certain words substantially more often than those same words are used by the general population, the general language model may not produce satisfactory results for utterances that include such words. For example, if a user has purchased albums by a particular artist who is not a mainstream artist, the user is more likely than a user in the general population to make utterances (e.g., spoken commands to play music) that include that artist's name. If the artists name is given very low weight in the general language model, or is omitted altogether, then the user's experience may be less than satisfactory.

One solution to the limitations inherent in large, general language models is to supplement them with smaller, more focused language models. For example, a language model that uses weightings based on a particular user's own word choice can provide an improvement in accuracy in comparison to the use of a general language model alone. User-specific data, such as the data associated with applications and services used by the user, can be a reliable predictor of which words a user will use in future utterances. A language model based on personalization data, such as user-specific data from applications and services used by the user, can therefore provide an accuracy improvement over general language models alone.

Figure 1:
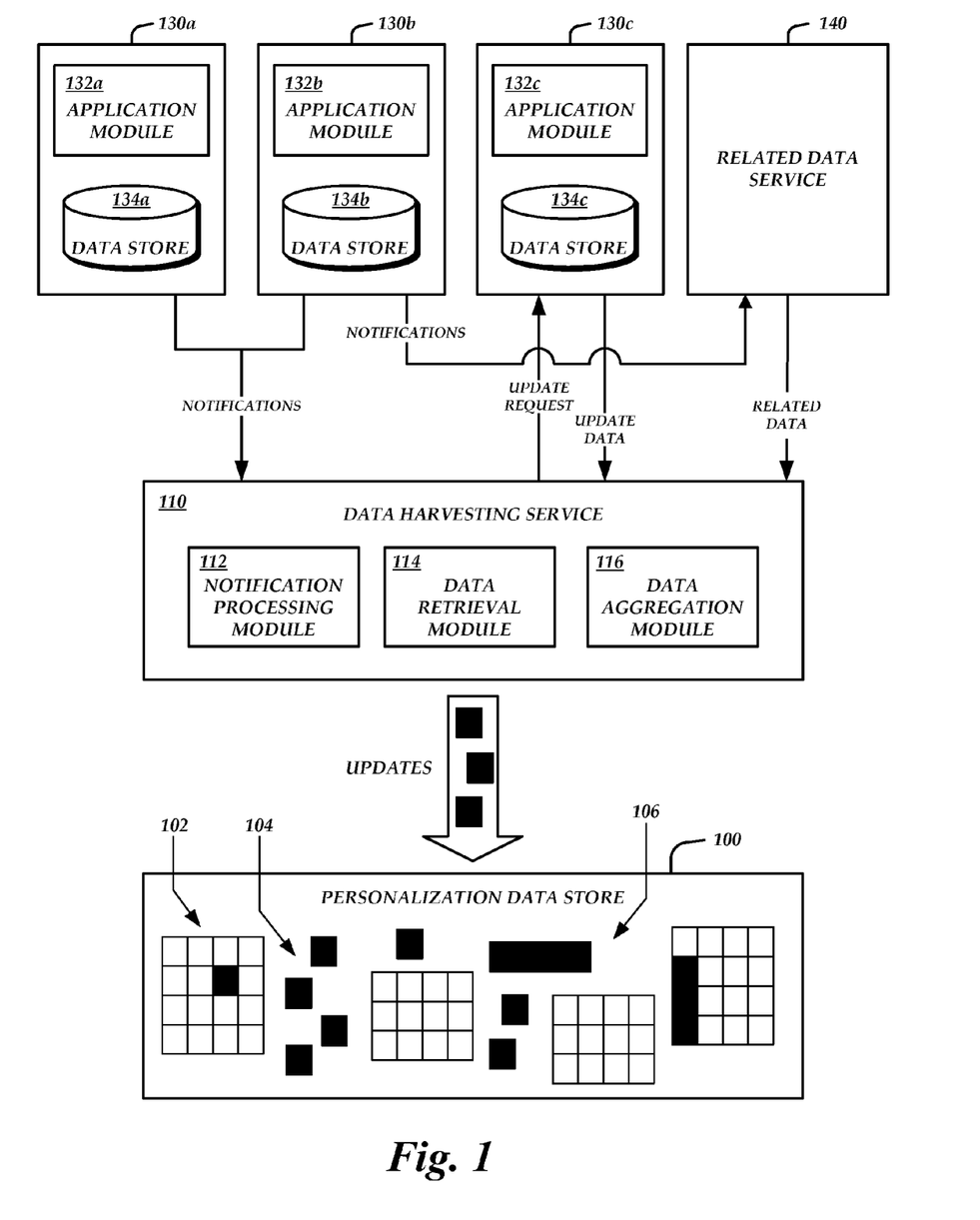
FIG. 1 is a block diagram of an illustrative personalization data harvesting implementation, including multiple applications, a data harvesting service, and a personalization data store.

FIG. 1 shows an illustrative data harvesting service 110 for obtaining spoken language understanding personalization data for use in building personal spoken language understanding models (e.g., ASR models, NLU models, etc.). The data harvesting service 110 can obtain the personalization data from the various services used by user. For example, data source 130a may correspond to a music player application or service, data source 130b may correspond to a shopping web site, and data source 130c may correspond to a social network. The data sources illustrated and described herein are illustrative only, and are not intended to be limiting. Generally described, any source of user-specific data may serve as a data source for the data harvesting service 110.

The data harvesting service 110 illustrated in FIG. 1 includes several modules for performing the features described herein, including a notification processing module 112, a data retrieval module 114, and a data aggregation module 116. The notification processing module 112 may be configured to obtain notifications from data sources 130 and process those notifications to extract personalization data for storage. The data retrieval module 114 may be configured to obtain user-specific data in bulk, such as when a user first registers to use a spoken language processing system with which the data harvesting service 110 is associated. The data aggregation module 116 may be configured to combine updates with previously stored data into a single data set or a smaller number of data sets, such as after update data has already been incorporated into a personal language model.

In some embodiments, data sources such as the music player 130a and shopping web site 130b may provide notifications regarding updates to user-specific data. Illustratively, a user may interact with an application module 132a of the music player 130a to purchase a new album by an obscure local artist. The data store 134a associated with the music player service 130a may store a catalog of music owned by the user, and that catalog may be updated to reflect that the user now owns that particular album. A notification may be generated regarding the new purchase, and the data harvesting service 110 may receive the notification.

The notification processing module 112 may process the notification as described in greater detail below. In the present example, the user's catalog of music may already have been obtained and stored in the personalization data store 100. An update data set containing information about the new album may be stored in the personalization data store 100 separately from the previously downloaded catalog. Storing update data sets separately from the primary data set with which they are associated facilitates efficient incremental updating for downstream processes, such as processes that update or rebuild personal language models based on such updates. Rather than obtaining the entire primary data set which has already been incorporated into a model (e.g., the user's music catalog), only the new data (e.g., the new album) may be obtained and incorporated into the model, thereby reducing the amount of processing required to update the model.

The personalization data store 100 shows various primary data sets and update data sets. For example, primary data set 102 may correspond to the user's music catalog, and update data sets 104 may correspond to songs purchased after the catalog was originally obtained. In some embodiments, a data set or collection of data sets may be a representation of an entire user-specific catalog of data maintained by a separate application or data source. In some embodiments, a data set or collection of data sets may include substantially all user-specific data maintained by a separate application that is relevant to spoken language understanding (e.g., song titles, artist). The same data set or collection of data sets may exclude some or all data maintained by the separate application that is not relevant to spoken language understanding (e.g., album art, record label). The term "data set" is not intended to imply that each such data set must necessarily include more than one item of data, or encompass data from more than one notification. A data set, including an update data set, may include zero, one, or more items of data. For example, an update data set 104 or 106, may include a single new item data to add to a user catalog, multiple items of data to add to a user catalog, a reference to an item of data that is to be deleted from a user catalog, etc.

Note that the separate objects shown in FIG. 1 are illustrative only, and are intended only to show that update data sets may in some way be stored separately from original data sets with which they are associated. In some embodiments, each data set, represented by a separate block or cluster of blocks in the personalization data store 100, may be stored in a physically separate location. For example, each data set may be stored in a different physical file, data page, data table, etc. However, the update data sets need not be physically separated from the primary data set with which they are associated. In some embodiments, some or all of the data in the personalization data store may be stored in a single or small set of physical files or data pages, such as in various tables of a relational database. In these implementations, the update data sets may only be logically separated from the primary data sets with which they are associated. In the present example, all data from the music player service 130*a* may be stored in a single table of a relational database, and that table may be indexed such that update data sets are logically separate units that can be quickly addressed and retrieved.

The notifications generated by data sources 130 need not always reflect a change to user-specific data at a data store 134 associated with a data source 130. In some embodiments, notifications may reflect user interactions that do not necessarily result in a change to user-specific data but nevertheless may be used to provide personalization in ASR. For example, the user may request playback of a particular song. Some music player services may record each such request in a data store. Other music player services, however, may simply respond by playing the requested song and generating a notification. The data harvesting service 110 may obtain the notification, and store data in the personalization data store 100 regarding the playback of the song.

In some embodiments, a data source may not generate notifications. If the spoken language processing system and the data source are not controlled by the same entity, then the data source may not implement the notification mechanism described above. For example, a separate data source 130*c*, such as a social network, may provide user-specific data upon request from the data harvesting service 110 rather than generating notifications that the data harvesting service 110 may receive. In such cases, the data harvesting service 110 may poll or otherwise periodically request update information from the data source 130*c*. Due to the lack of a notification for each modification to user-specific data in the data store 134*c* and each user activity, the updated data that the data harvesting service 110 receives may not be a single atomic unit of data. Rather, the data may include data reflecting any number of updates that have occurred since the last such transmission. As with individual updates from other data sources, the data set 106 may be stored in the personalization data store as a separate data set.

In some embodiments, data related to user-initiated actions may be provided to the data harvesting service 110 even though such data does not come from the data source 130 corresponding to the user-initiated action. Related data may be identified by, e.g., a third-party service, and provided to the data harvesting service 110 when a user-initiated action raises the likelihood of certain words occurring in user utterances, even though the words are not necessarily reflected in an update to the user-specific data or a user-initiated action. For example, a related data service 140 may be in communication with one or more other data sources, such as the shopping web site 130*b*. When a user makes a purchase on the shopping web site 130*b*, a notification may be generated as described above. The related data service 140 may receive the notification in addition to the data harvesting service 110. The related data service 140 may provide information to the data harvesting service 110 regarding other products that the user may soon purchase, such as a commonly purchased accessory to an item that the user recently purchased.

In the above example, the user's purchase of the item raises the likelihood that a subsequent user utterance will include the name of the accessory because there is an increased likelihood that the user will purchase the accessory. The data harvesting service 110 may store such related data in the personalization data store 100 in a manner similar to the storage of update data from data sources 130 associated with the user. In some embodiments, such related data may be time-sensitive, and may be removed from the personalization data store 100 after a period of time has passed (e.g., after passage of a period of time exceeding the time in which users typically buy the accessory). Purging related data in this way can aid in keeping the personal language model focused on only those items of particular relevance to current or future speech processing tasks.

Process for Initial User Data Load

Figure 2:
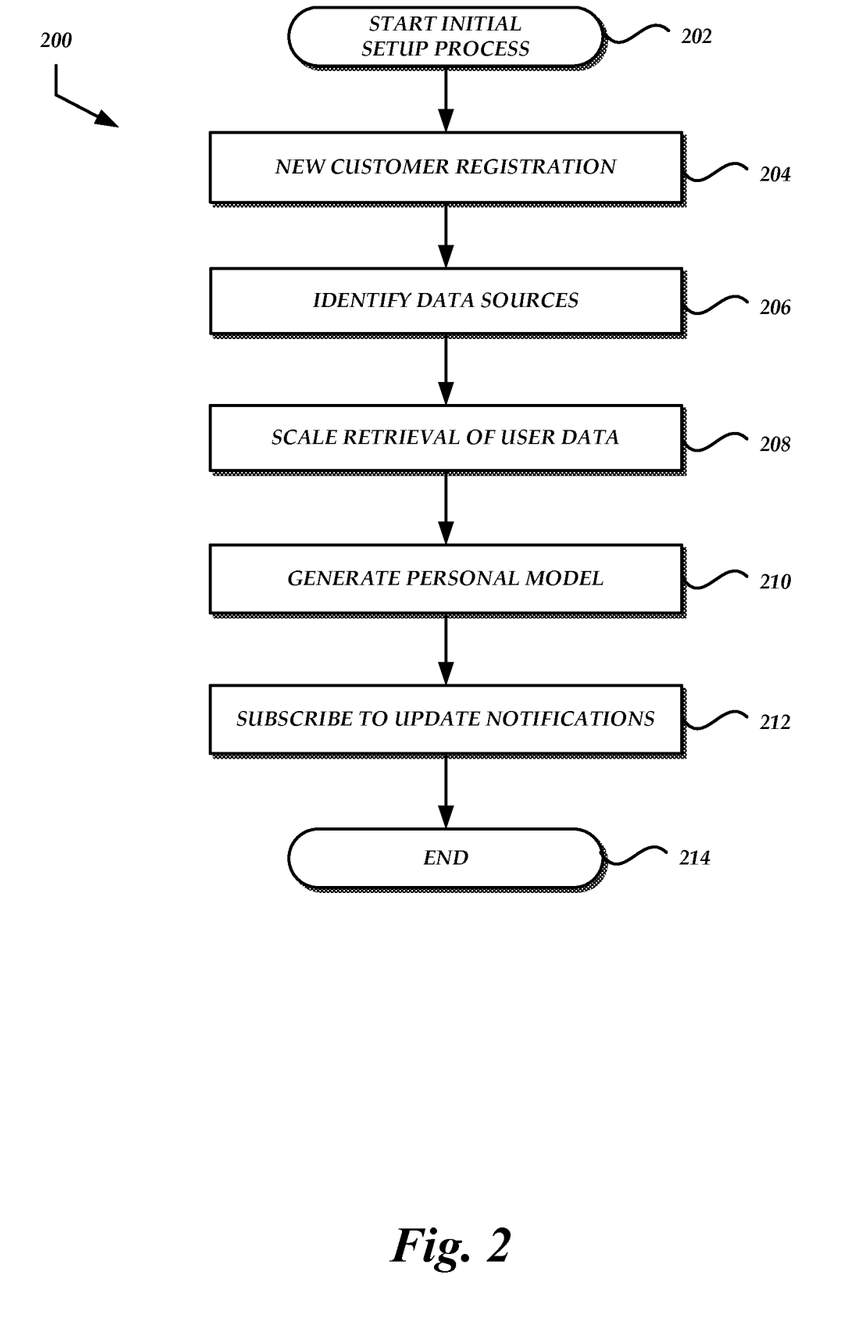
FIG. 2 is a flow diagram of an illustrative process for obtaining personalization data for a new user.
Figure 3:
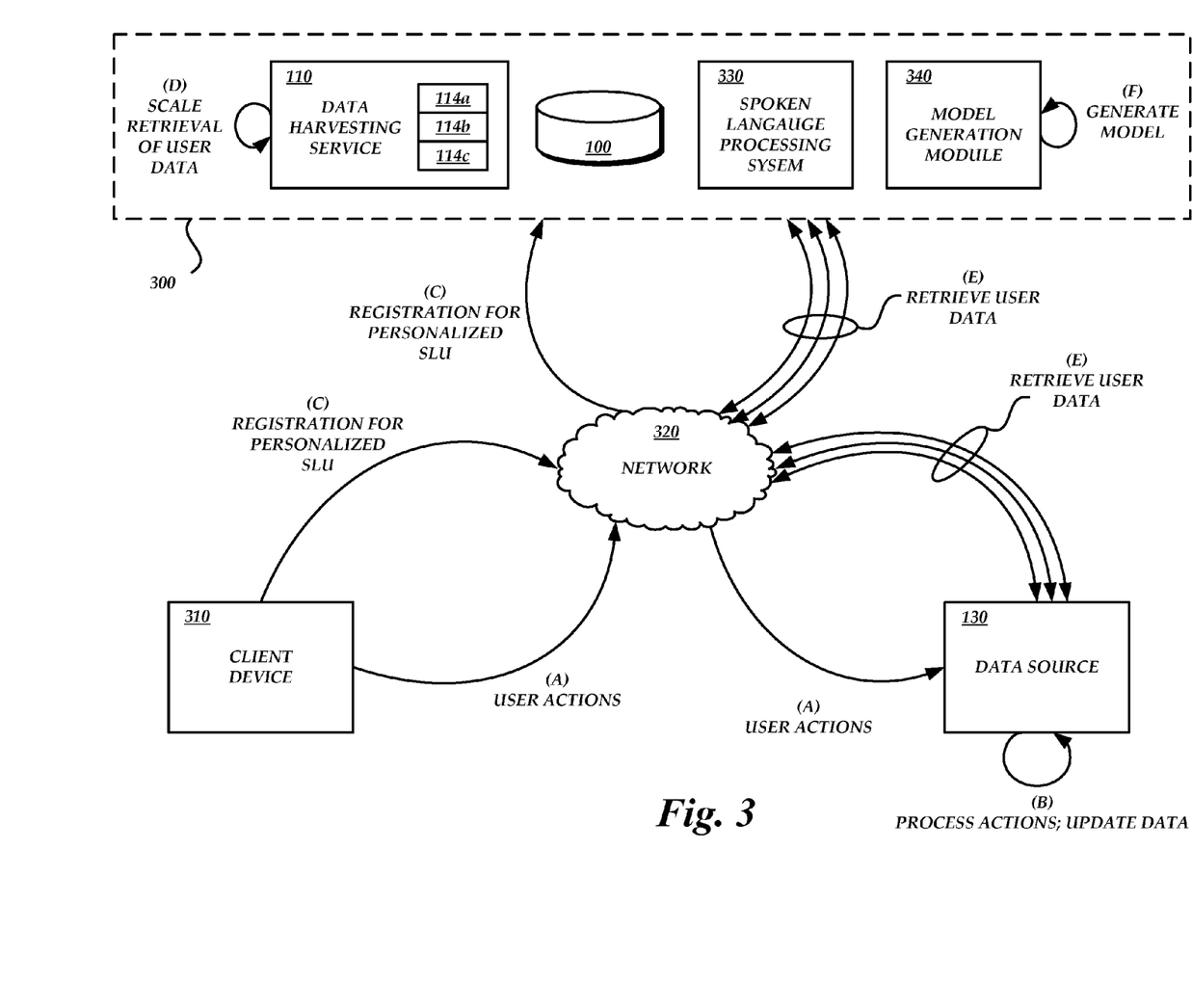
FIG. 3 is a block diagram of an illustrative spoken language processing system in a network environment, showing example interactions and data flows between the spoken language processing system and various computing systems.

FIG. 2 illustrates a sample process 200 for obtaining existing personalization data for a new user of a spoken language processing system. FIG. 3 illustrates a sample networked speech processing environment in which the process 200 of FIG. 2 may be implemented. Some of the example data interactions and data flows shown in FIG. 3 illustrate various blocks and portions of the process 200, as described in greater detail below. Advantageously, a data harvesting service 110 executing the process 200, or portions thereof, can scale retrieval of user-specific data from multiple data sources in order to quickly build the personalization data set for the user and, therefore, to facilitate quick building of a personal spoken language understanding model for the user (e.g., a language model or an NLU model).

The networked speech processing environment shown in FIG. 3 includes a network computing services provider 300, a client device 310, and a data source 130. The various systems may communicate with each other via a communication network 320. The network 320 may be a publicly accessible network of linked networks, possibly operated by various distinct parties, such as the Internet. In other embodiments, the network 320 may include a private network, personal area network, local area network, wide area network, cable network, satellite network, cellular telephone network, etc. or combination thereof, each with access to and/or from the Internet.

The network computing services provider 300 can be a computing system configured to provide various computing services, including spoken language processing and personalization. In some embodiments, the network computing services provider 300 can be a server or group of servers that may be accessed via the network 320. The network computing services provider 300 can include a number of components, modules or services, such as a data harvesting service 110 to obtain and manage personalization data for users of the network computing services provider 300. As described above, the data harvesting service 110 may also include various components, including one or more scalable data retrieval modules 114a-114c. The network computing services provider 300 may also include various data stores, such as a personalization data store 100. In some embodiments, as shown, the network computing services provider 300 may also include a spoken language processing system 330 for performing automatic speech recognition and/or natural language understanding on user utterances, and a model generation module 340 for generating and updating spoken language processing models (e.g., ASR or NLU models) using personalization data obtained by the data harvesting system 110.

The network computing services provider 300 may include multiple computing devices, such as computer servers, logically or physically grouped together. The components of the network computing services provider 300 can each be implemented as hardware, such as a server computing device, or as a combination of hardware and software. In addition, the components of the network computing services provider 300 can be combined on one server computing device or separated individually or into groups on several server computing devices. For example, the data retrieval modules 114a-114c may be implemented as scalable computing systems that can scale responsive to current conditions (e.g., network conditions, computing resource availability, etc.), the data to be retrieved, and the like. The spoken language processing system 330 and/or model generation module 340 may be implemented on individual server computing devices or groups of server computing devices that are separate from those associated with the data harvesting service 110. In some embodiments, a server or group of servers may be configured to perform some combination of features associated with the data harvesting service 110, spoken language processing system 330, and/or model generation module 340. In some embodiments, the network computing services provider 300 may include additional or fewer components than those illustrated in FIG. 3. In some embodiments, the features and services provided by the network computing services provider 300 may be implemented as web services consumable via the communication network 320. In further embodiments, the network computing services provider 300 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The client device 310 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, set-top boxes, televisions configured with network access and program execution capabilities (e.g., "smart TVs"), and various other electronic devices and appliances.

The data source 130 can correspond to a logical association of one or more computing devices for hosting interactive content and processing user interactions over the network 320. For example, a data source 130 may include a server that hosts an application module for providing music playback capabilities. The data source 130 may also include a server that hosts a data store for storing user-specific music catalogs.

With reference now to FIG. 2, the process 200 begins at block 202. For example, if the process 200 is implemented by the data harvesting service 110, the process 200 may begin manually or automatically upon receipt of a new customer registration with the network computing services provider 300. The process 200 may be embodied in a set of executable program instructions stored on non-transitory computer-readable media, such as short-term or long-term memory of one or more computing devices associated with the data harvesting service 110. When the process 200 is initiated, the executable program instructions can be loaded and executed by the one or more computing devices.

At block 204, the data harvesting service 110 may be notified that a user has registered as a new customer of the spoken language processing system 300. A personal language model may be developed for the user based on user-specific information associated with the user. As shown in FIG. 3, the user may have performed various user actions at (A) with a data source 130. The data source 130 may have processed the user actions at (B) and updated user-specific data. Returning to the example above, the user may have purchased one or more albums, requested playback of various songs on those albums, etc. The data source 130 may maintain information about these and other user actions. The user may then register with the network computing services provider 300 at (C) to use personalized spoken language understanding ("SLU") services provided by the network computing services provider 300. In some embodiments, the user may not expressly request such services, but may nevertheless be provided with personalized SLU processing services by the network computing services provider 300. For example, the network computing services provider 300 may be associated with one or more data sources 130, and may automatically access user-specific data in order to provide personalized SLU processing. In such cases, the user may request to opt-out of such personalization services.

At block 206, the data harvesting service 110 can identify potential sources of personalization data for the user. In some embodiments, the user may provide a listing of data sources (e.g., during the registration process), and the data harvesting service 110 may access that listing. In some embodiments, network computing services provider 300 may be associated with any number of potential sources of data for the user, and can automatically access user-specific data from these data sources 130 without requiring the user to identify the associated data sources.

At block 208, the data harvesting service 110 can scale retrieval of user-specific data from the data sourced identified above, as also shown in FIG. 3 at (D). Scaling retrieval of user-specific data can include using multiple data retrieval modules 114. For example, a separate server computing device implementing an instance of the data retrieval module 114 may be used to obtain user data from each separate data source. In some cases, a single data source may have a large amount of data, or enough data that using a single data retrieval module 114 is inefficient. For example, the current user may have an extensive music library including thousands of songs. Multiple data retrieval modules 114a-114c may be spawned or employed to download information about the user's music library in parallel at (E). Each data retrieval module 114 may retrieve one or more subsets of the total data set for the user. These separate subsets may be stored as such in the personalization data store 100, or they may be aggregated into one initial primary data set (e.g., by the data aggregation module 116). In some embodiments, retrieval of user data is not scaled, but rather is performed by a single data retrieval module 114.

At block 210, a personal language model may be generated for the user, as also shown in FIG. 3 at (F). The personal language model may be based on some or all of the personalization data for the user in the personalization data store 100.

At block 212, the data harvesting service 110 may subscribe to update notifications for the data sources, identified above, that provide such notifications. In some cases, subscribing to notifications may include providing a callback to an individual data source or to some message queue or notification broadcasting service. When a notification is available for which the data harvesting service 110 has subscribed, the callback may be executed and the data harvesting service 110 may response accordingly. An example process 400 for processing update notifications is described below with respect to FIGS. 4 and 5.

Process for Obtaining Updates to Personalization Data

Figure 4:
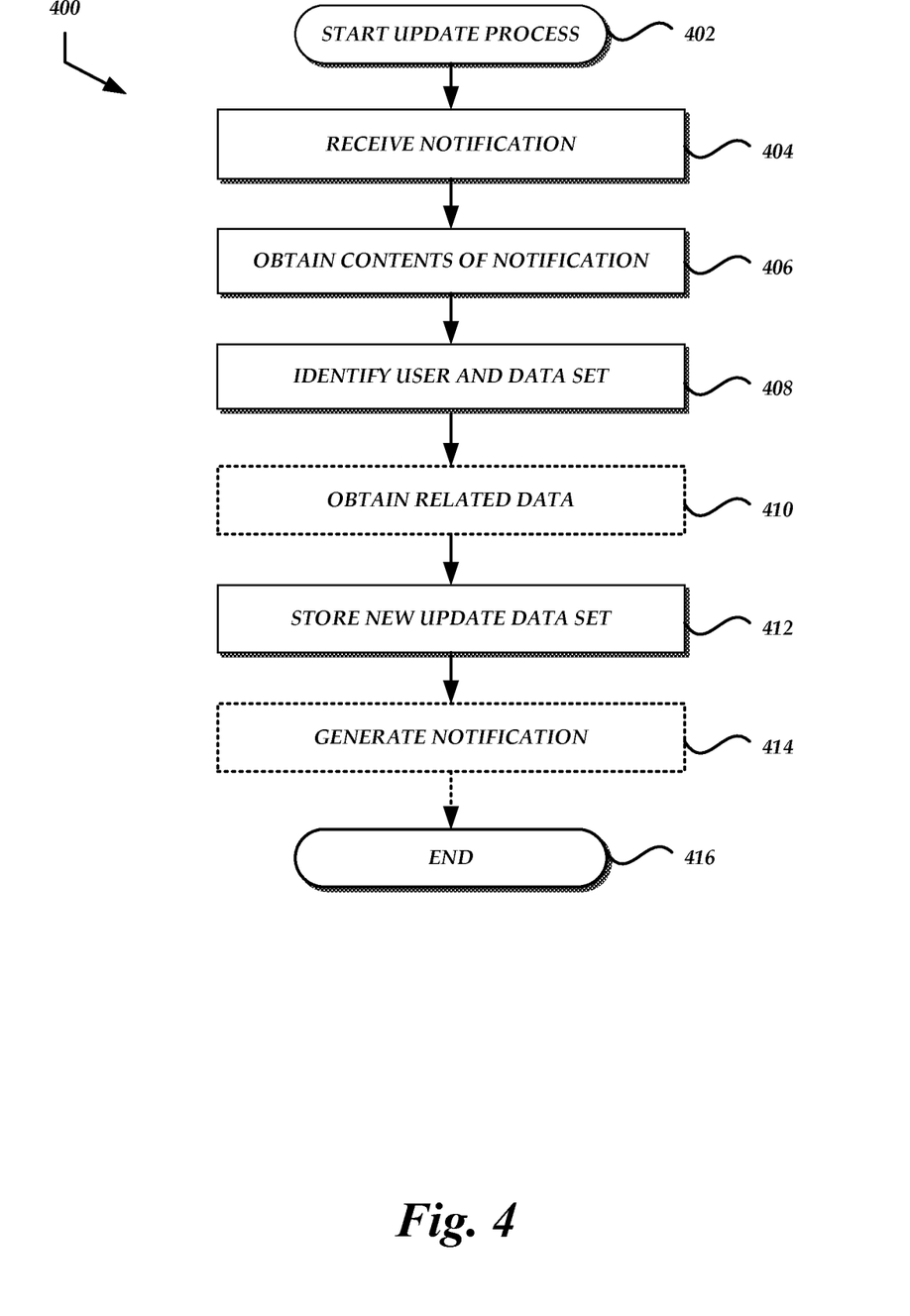
FIG. 4 is a flow diagram of an illustrative process for obtaining and storing update data for personalized spoken language understanding data sets.
Figure 5:
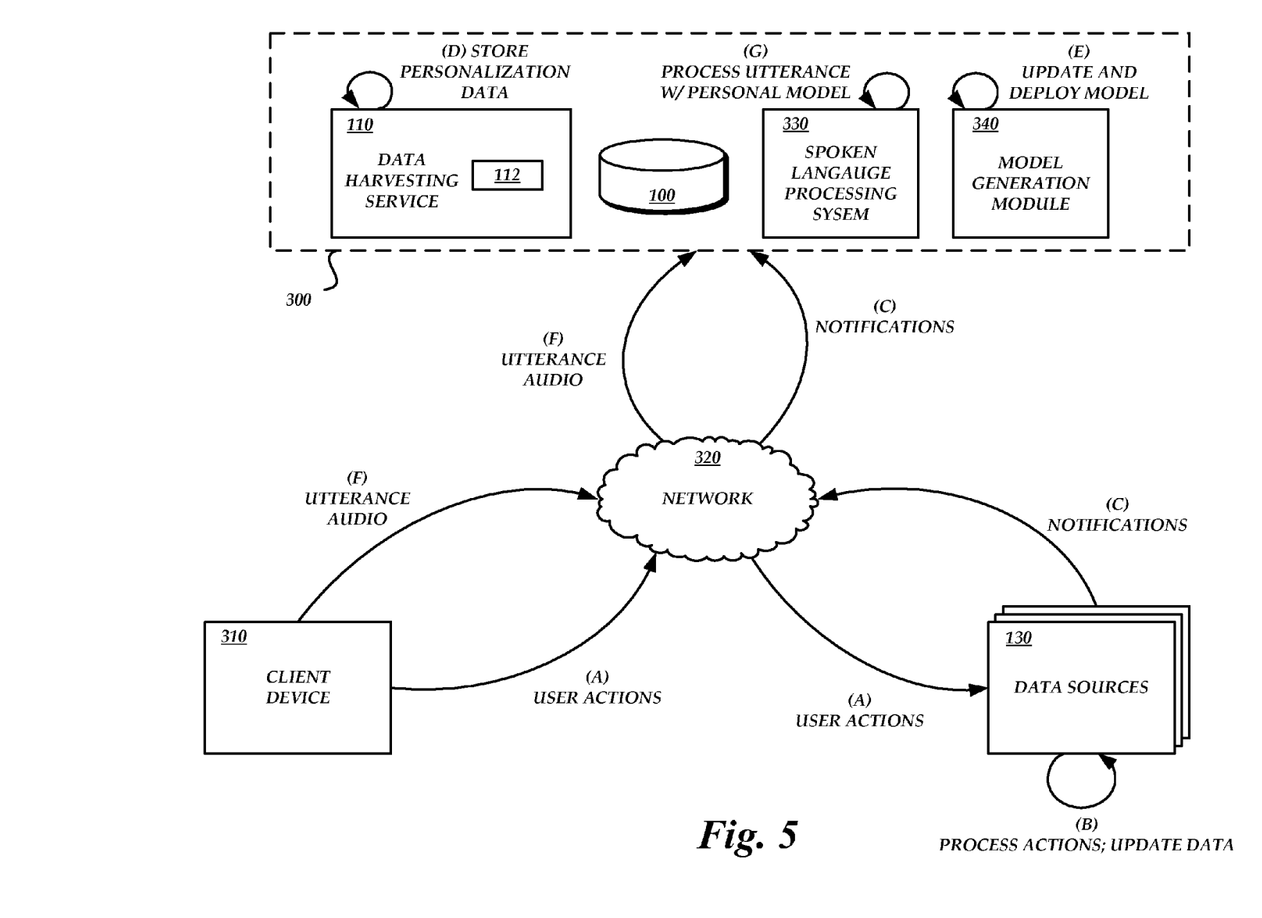
FIG. 5 is a block diagram of an illustrative spoken language processing system in a network environment, showing example interactions and data flows between the spoken language processing system and various computing systems.

FIG. 4 illustrates a sample process 400 for processing update notifications in order to store updates to personalization data for users of the spoken language processing system. FIG. 5 illustrates a sample networked speech processing environment in which the process 400 of FIG. 4 may be implemented. Some of the example data interactions and data flows shown in FIG. 5 illustrate various blocks and portions of the process 400, as described in greater detail below. Advantageously, a data harvesting service 110 executing the process 400 or portions thereof can obtain update notifications regarding updates to user-specific data and user actions. The data harvesting service 110 can then store personalization data for the user such that data regarding the updates (e.g., update data sets) are maintained separately from previously received data to which the updates apply (e.g., primary data sets or other update data sets).

The process 400 begins at block 402. For example, if the process 400 is implemented by the data harvesting service 110, the process 400 may begin manually or automatically upon receipt of an update notification from a data source 130 or some component of the network computing services provider 300. The process 400 may be embodied in a set of executable program instructions stored on non-transitory computer-readable media, such as short-term or long-term memory of one or more computing devices associated with the data harvesting service 110. When the process 400 is initiated, the executable program instructions can be loaded and executed by the one or more computing devices.

At block 404, the notification processing module 112 or some other module or component can receive a notification. As described above, the data harvesting service 110 may subscribe to notifications from various data sources 130. FIG. 5 illustrates the transmission of user action data at (A) from a client device 310 to a data source 130. The data source 130 can process the user actions at (B) and, optionally, update data (e.g., in a data store 134). The data source 130 may then generate a notification at (C) that is received by the network computing services provider 300.

In some embodiments, the data sources 130 may send notifications in a prioritized or otherwise non-chronological order. For example, a data source 130 may determine or assign a priority level or score to various types of notifications. User activities and other data modifications that can have a high impact on future user activities (e.g., the purchase of an album may likely lead to requesting playback of the album) may be given a high priority. Activities and other modifications expected to have a lower impact on future user activities (e.g., playback of a song) may be given a lower priority. The data source 130 may reserve a particular amount of computing resources for transmitting high priority notifications, and a separate (potentially lower) amount of computing resources for transmitting low priority notifications. In some embodiments, low priority notifications for a particular user or group of users may be collected and sent as a batch, such as during periods when there is excess computing capacity available.

At block 406, the notification processing module 112 or some other module or component can analyze the notification to obtain its contents. Notifications may include various data, such as an identifier of the user to which the notification applies, an identifier of the data source from which the notification originated, and data regarding the modification to user-specific data at the data source 130 or the user action performed in conjunction with the data source. For example, the notification may include a "delta" or data regarding a difference between the user-specific data before and after the subject event. In some embodiments, the notification may not contain data regarding the modification to the user-specific data at the data source 130 (e.g., when the delta is too large to be transmitted as part of a notification and messaging system). For example, the notification may include a link or pointer to delta or other data. The notification processing module 112 may send a request to the data source 130 for the delta or other data regarding the modification, or otherwise access the data at a location identified in the notification or associated with the data source 130.

As described above, a data source 130 may determine a priority associated with a notification. In some embodiments, the data source 130 may include priority data in a notification. The notification processing module 112 can extract the priority information and, e.g., determine when to retrieve linked data associated with the notification, whether to store the priority information in association with the notified data, etc. In some embodiments, a component or module of the spoken language processing system can use the priority to determine when to initiate generation of a personal model that incorporates the data associated with priority, whether to initiate generation of a personal model incorporating the data, whether to aggregate multiple low-priority items for use in a later personal model generation process, etc.

At block 408, the notification processing module 112 or some other module or component can identify the user to which the notification applies (e.g., from a user identifier obtained from the notification). The notification processing module 112 can also identify the data set for which to store an update data set based on the contents of the notification. For example, the notification may apply to the user's music catalog. When storing an update data set, the notification may tie the update data set to a primary data set and/or other update data sets associated with the user's music catalog, as described below.

At block 410, the notification processing module 112 or some other module or component may obtain data that is related to the current update. As described above, a related data service 140 may also have subscribed to notifications regarding updates from the particular data source 130b. The related data service 140 may generate related data relevant to speech recognition. In some embodiments, the data harvesting module 110 may proactively request related data from the related data service 140. In some embodiments, the related data service 140 may be part of, or associated with, the data harvesting module 110.

The related data may be based on correlations of words or phrases to words or phrases included in the notification from the data source 130. The related data service 140 may include or have access to a data store of data and relationships between data. In some embodiments, the related data service 140 may analyze notifications and/or other information to determine the relations and correlations that it uses to generate related data. For example, if a user purchases an album by a particular artist, the user may be more likely to make utterances that reference other songs or albums by that artist, or other closely related artists. The related data service 140 may therefore provide related data that includes other albums by that artist, the names of other artists closely associated with artist, etc.

At block 412 the notification processing module 112 or some other module or component can store one or more new update data sets in the personalization data store 110, as illustrated in FIG. 5 at (D). The data in a new update data set may include some or all of the contents of the notification processed as described above, data derived from the notifications, related data received form a related data service 140, some combination thereof, etc. For example, the raw, unprocessed data obtained by the notification processing module 112 may be stored as a new updated data set. As another example, the data may be processed such that a representation of the data may be stored in a format that can be used by consumers of the data. As described above, the update data set may be stored physically or logically separate from the primary data set with which it is associated. The data harvesting service 110 may store related data in the personalization data store 100 in its own data set, as part of the update data set with which it is associated, in a dedicated related data set, or in some other manner.

At block 414, the notification processing module 112 or some other module or component can generate a notification. The notification may indicate that new personalization data for a particular user has been stored in the personalization data store 110. A model generation module 340 or some other model builder system or service may receive such notifications, and generate updated personal models at (E) that incorporate or are otherwise based on the new personalization data (e.g., personalized language or NLU models). In some embodiments, the data harvesting service 110 may initiate execution of such a model builder directly, or no such notification or execution may be initiated. The updated personal models may then be deployed by, e.g., storing the models in a models data store, providing the models to the spoken language processing system 330, etc. One example of a model building service that updates and/or regenerates SLU models based on personalization data is described in U.S. patent application Ser. No. 14/014,154, titled EFFICIENT GENERATION OF PERSONALIZED SPOKEN LANGUAGE UNDERSTANDING MODELS and filed concurrently herewith, the contents of which are hereby incorporated by reference in their entirety.

Subsequent to the user actions at (A), a user may make an utterance, and audio of that utterance may be provided to the network computing services provider 300 at (F). The spoken language processing system 330 may then process the utterance with the personal model at (G).

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
    a data store storing spoken language understanding personalization data for a plurality of users, wherein spoken language understanding personalization data for a first user of the plurality of users comprises:
        one or more first data sets comprising first personalization data received from a first application separate from the computer system, wherein the first personalization data corresponds to at least a portion of first application data associated with the first user; and
        one or more second data sets comprising second personalization data received from a second application separate from the computer system, wherein the second personalization data corresponds to at least a portion of second application data associated with the first user; and
    one or more processors in communication with the data store, the one or more processors programmed to at least:
        obtain a first notification regarding an update to the first application data associated with the first user, the first notification comprising first priority data;
        store, in the data store, a first update data set based at least on the first notification, wherein the first update data set corresponds to at least a portion of the update to the first application data associated with the first user;
        determine, based at least on the first priority data indicating a low priority for the first update data, not to update a spoken language understanding model, associated with the user, using the first update data;
        obtain a second notification regarding an update to the second application data associated with the first user, the second notification comprising second priority data;
        store, in the data store, a second update data set based at least on the second notification, wherein the second update data set corresponds to at least a portion of the update to the second application data associated with the first user;
        determine, based at least on the second priority data indicating a high priority for the second update data, to update the spoken language understanding model using the second update data; and
        update the spoken language understanding model associated with the first user using the second update data.

2. The computer system of claim 1, wherein the first update data set is stored such that it is accessible separately from the one or more first data sets.

3. The system of claim 1, wherein the one or more processors are further programmed to:
    determine, based on the first priority data indicating a low priority for the first update data, to aggregate the first update data with third update data, wherein the third update data is associated with third priority data indicating a low priority for the third update data; and
    aggregate the first update data with the third update data.

4. A computer-implemented method comprising:
    as executed by one or more computing devices configured to execute specific instructions,
        storing first personalization data received from an application separate from the one or more computing devices, wherein the first personalization data corresponds to at least a portion of application data associated with a user of the application;
        determining, based on the first personalization data being associated with a low priority, not to update a spoken language understanding model associated with the user;
        obtaining a notification regarding a change to the application data associated with the user;
        storing second personalization data based at least on the notification, wherein the second personalization data corresponds to at least a portion of the change to the application data associated with the user;
        determining, based on the second personalization data being associated with a high priority, to update the spoken language understanding model associated with the user; and
        updating the spoken language understanding model using the second personalization data.

5. The computer-implemented method of claim 4, further comprising subscribing to notifications from the application.

6. The computer-implemented method of claim 4, further comprising subscribing to notifications from a plurality of applications that maintain application data associated with the user.

7. The computer-implemented method of claim 4, further comprising:
    storing third personalization data received from a second application separate from the application, wherein the third personalization data corresponds to at least a portion of second application data associated with the user;
    obtaining a second notification regarding a second change to the second application data associated with the user; and
    storing fourth personalization data based at least on the second notification, wherein fourth personalization data corresponds to at least a portion of the change to the second application data associated with the user.

8. The computer-implemented method of claim 4, wherein the first personalization data corresponds to a music library of the user, recent purchases by the user, or an address book of the user.

9. The computer-implemented method of claim 4, wherein the second personalization data is stored in a separate data object than the first personalization data.

10. The computer-implemented method of claim 9, wherein the separate data object comprises a separate electronic file, a separate data page, or a separate data partition.

11. The computer-implemented method of claim 4, wherein the notification comprises the second personalization data.

12. The computer-implemented method of claim 4, further comprising storing priority data in association with the second personalization data.

13. The computer-implemented method of claim 4, wherein the notification comprises priority data.

14. The computer-implemented method of claim 4, wherein the change to the application data comprises one of an addition, a deletion, or a modification.

15. The computer-implemented method of claim 4, wherein the second personalization data is stored such that it is accessible separately from the first personalization data.

16. The computer-implemented method of claim 4, further comprising:
  determining, based on the first personalization data being associated with a low priority, to aggregate the first personalization data with third personalization data, wherein the third personalization data is also associated with a low priority; and
  aggregating the first personalization data with the third personalization data.

17. One or more non-transitory computer readable media comprising executable code that, when executed, cause one or more computing devices to perform a process comprising:
  storing first personalization data received from an application separate from the one or more computing devices, wherein the first personalization data corresponds to at least a portion of application data associated with a user of the application;
  determining, based on the first personalization data being associated with a low priority, to aggregate the first personalization data with second personalization data, wherein the second personalization data is also associated with a low priority;
  obtaining a notification regarding a change to the application data associated with the user;
  storing third personalization data based at least on the notification, wherein the third personalization data corresponds to at least a portion of the change to the application data associated with the user;
  determining, based on the third personalization data being associated with a high priority, to update the spoken language understanding model associated with the user; and
  updating the spoken language understanding model using the third personalization data.

18. The one or more non-transitory computer readable media of claim 17, wherein the process further comprises subscribing to notifications from the application.

19. The one or more non-transitory computer readable media of claim 17, wherein the process further comprises subscribing to notifications from a plurality of applications that maintain application data associated with the user.

20. The one or more non-transitory computer readable media of claim 17, wherein the process further comprises:
  storing fourth personalization data received from a second application separate from the application, wherein the fourth personalization data corresponds to at least a portion of second application data associated with the user;
  obtaining a second notification regarding a second a change to the second application data associated with the user; and
  storing fifth personalization data based at least on the second notification, wherein fifth personalization data corresponds to at least a portion of the change to the second application data associated with the user.

21. The one or more non-transitory computer readable media of claim 17, wherein the first personalization data corresponds to a music library of the user, recent purchases by the user, or an address book of the user.

22. The one or more non-transitory computer readable media of claim 17, wherein the second personalization data is stored in a separate data object than the first personalization data.

23. The one or more non-transitory computer readable media of claim 22, wherein the separate data object comprises a separate electronic file, a separate data page, or a separate data partition.

24. The one or more non-transitory computer readable media of claim 17, wherein the notification comprises the second personalization data.

25. The one or more non-transitory computer readable media of claim 17, wherein the process further comprises storing priority data in association with the second personalization data.

26. The one or more non-transitory computer readable media of claim 17, wherein the notification comprises priority data.

27. The one or more non-transitory computer readable media of claim 17, wherein the change to the application data comprises one of an addition, a deletion, or a modification.

28. The one or more non-transitory computer readable media of claim 17, wherein the second personalization data is stored such that it is accessible separately from the first personalization data.

* * * * *